United States Patent
Furukawa et al.

(10) Patent No.: US 6,388,960 B1
(45) Date of Patent: May 14, 2002

(54) DISK PLAYER HAVING AUTOMATIC CONTROL BASED UPON AUDIO DISK OR MEMORY DISK DETERMINATION

(75) Inventors: Kiyoshi Furukawa; Yoichi Yamazaki; Fumio Endo; Akira Hayama; Toshiyuki Kimura; Junichi Nishida; Hitoshi Sato; Kenji Kaneko, all of Kawagoe (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 08/563,890

(22) Filed: Nov. 22, 1995

Related U.S. Application Data

(63) Continuation of application No. 07/666,580, filed on Mar. 8, 1991, now abandoned.

(30) Foreign Application Priority Data

| Apr. 17, 1990 | (JP) | P2-100619 |
| Apr. 17, 1990 | (JP) | P2-100620 |
| Apr. 27, 1990 | (JP) | P2-112747 |
| Apr. 27, 1990 | (JP) | P2-112748 |
| May 8, 1990 | (JP) | P2-119170 |

(51) Int. Cl.$^7$ .............................................. G11B 17/22
(52) U.S. Cl. ................................ 369/30.24; 369/47.11; 369/53.22
(58) Field of Search ........................... 369/47, 32, 54, 369/58, 48, 49, 59, 2, 47.1–59.27; 358/342, 341; 364/443, 449, 449.1–449.5; 360/27; 386/96, 104–106, 125–126

(56) References Cited

U.S. PATENT DOCUMENTS

| 4,502,123 A | * | 2/1985 | Minami et al. ......... 364/449 X |
| 4,796,100 A | * | 1/1989 | Sakaguchi .................. 369/48 |
| 4,878,129 A | * | 10/1989 | Yasuda et al. ............. 360/10.1 |
| 5,101,357 A | * | 3/1992 | Tempelhof .................. 364/449 |
| 5,157,614 A | * | 10/1992 | Kashiwazaki et al. ........ 369/30 |

OTHER PUBLICATIONS

Yamaha CD–3, Owner's Manual, p. 9.*
Patent Abstracts of Japan, vol. 6, No. 119 (E–116) Jul. 3, 1982, & JP–A–57 048882 (Pioneer Electronic Corp) Mar. 20, 1982.
Patent Abstracts of Japan, vol. 14, No. 078 (P–1006) Feb. 14, 1990, & JP–A–01 294276 (Alpine Electron Inc) Nov. 28, 1989.

(List continued on next page.)

*Primary Examiner*—W. R. Young
(74) *Attorney, Agent, or Firm*—Perman & Green, LLP

(57) ABSTRACT

An audio disk/memory disk player. At the time of playing a disk, TOC information in a lead-in area will be read out first after loading of the disk is complete. The player determines whether the disk to be played is an audio disk (CD) or a memory disk (CD-ROM) based on identifying information in the TOC information. If the disk is the memory disk, the operation goes directly to a pause mode so that upon reception of a read command transition to the searching for a designated address is promptly executed to quickly read out the desired data. Only when the disk being played is the audio disk, the audio system is changed to the audio disk from another source, thus permitting a user to view a map while listening to the previous source. When playing for an area having a series of group information recorded is complete in special play mode, the mode is quickly changed to the pause mode in the case of the memory disk to wait for the read command, thus ensuring quick reading of designated map data. If the disk discrimination result indicates the memory disk, a muting process is performed to inhibit a sound generation from a loudspeaker. If in this case there are operation commands originating from erroneous confirmation by the user, at least one of the commands is ignored.

3 Claims, 11 Drawing Sheets

OTHER PUBLICATIONS

Patent Abstracts of Japan, vol. 12, No. 123 (P–690) Apr. 16, 1988, & JP–A–62 246182 (Pioneer Electronic Corp) Oct. 27, 1987.

Patent Abstracts of Japan, vol. 4, No. 67 (E–011) May 20, 1980, & JP–A–55 035537 (Hitachi Ltd) Mar. 12, 1980.

Patent Abstracts of Japan, vol. 12, No. 439 (P–788) Nov. 18, 1988, & JP–A–63 167493 (Matsushita Electric Ind Co Ltd) Jul. 11, 1988.

Patent Abstracts of Japan, vol. 11, No. 342 (P–635) Nov. 10, 1987, & JP–A–62 124670 (Pioneer Electronic Corp) Jun. 5, 1987.

Patent Abstracts of Japan, vol. 13, No. 239 (P–879) Jun. 6, 1989, & JP–A–01 043861 (Hamamatsu Photonics KK) Feb. 16, 1989.

* cited by examiner

DISK PLAYER HAVING AUTOMATIC CONTROL BASED UPON AUDIO DISK OR MEMORY DISK DETERMINATION

This application is a continuation of copending application(s) Ser. No. 07/666,580 filed on Mar. 8, 1991 now abandoned.

BACKGROUND OF THE INVENTION

1. Field of the Invention

The present invention relates to a disk player, and more particularly, to a disk player which can play both an audio disk and a memory disk.

2. Description of Background Information

A disk player, adapted to be mounted in a vehicle, to play a digital audio disk (hereafter referred to simply as "audio disk") or a so-called CD (compact Disk) is designed to function as follows. After the disk is loaded into a play position, various types of servo systems will be invoked to provide playable circumstances. It is then determined, for example, whether or not the disk to be played this time is the same as the previous one. If the disk is the same, it will be played starting at the last address of the previous playing; if not, the disk will be played beginning with the first piece of music.

While the disk player is installed in a vehicle as one of on-vehicle devices, a so-called navigation system has recently been developed. The navigation system has a so-called CD-ROM having map data stored therein. This system reads map data of the desired map from the CD-ROM, and supplies the data as a display information signal to a display. As a result, the map is shown on the display so that a user can acknowledge or confirm the present location of the vehicle. Since the CD-ROM (hereafter referred to as "memory disk"), a medium to store map data, has the same signal format as the CD, both the audio disk and memory disk are playable by a single disk player.

With the memory disk in use, when the disk player receives a read command for the map data of the desired map from a system controller, the player, responding thereto, needs to shift to an operation to read map data at the designated address. Therefore, if the memory disk, when loaded to the play position, is accessed to immediately start playing with the first music piece or at the last address as in the case of the audio disk, a pickup position will change before the read command is received from the system controller. It therefore inconveniently takes time to search for the head address of the required map data after reception of the read command.

An on-vehicle multisource reproducing device with multiple audio sources, such as audio disk player and AM/FM tuner, is designed to give priority to the display player such that when a disk is loaded into the disk player while another source other than the CD is being played, a reproduction signal of the disk player is automatically selected upon completion of the loading of the disk to the play position, and is then fed to a loudspeaker.

Suppose the disk player for both audio and memory disks is installed as one of the multiple audio sources in the on-vehicle multisource reproducing device. Then, if the reproducing signal of the disk player is selected immediately after the memory disk is loaded to a play position to display the map during playing a source other than the CD, as per the prior art as mentioned above, there will arise a problem that if one has been listening to the AM/FM tuner, the reproduced tone will pant.

On-vehicle single disk players to play the audio disk are so designed as to execute auto-repeat play. In other words, in sequential play mode where the disk player sequentially plays pieces of music from the first piece, when all pieces are played, the operation will automatically return to the first piece to repeat the playing. There is a so-called multidisk player which stores multiple CDs (six CDs, for example) and selectively plays one of them. In sequential play mode, this multidisk player changes a disk with another when each disk is played through to start with the first piece of the new disk. In random play mode, on the other hand, when one music piece is played through, the multidisk player produces the disk number and track number of the next music piece to be played using random numbers, to start playing that piece.

As described earlier, with the memory disk in use, when the disk player receives a read command for the map data of the desired map from a system controller, the player should execute an operation to read map data at the designated address. Therefore, in an audio/memory disk player, when a special play mode, such as auto-repeat play or random play is set, a pickup position will change before the read command is received from the system controller if the special play mode is executed in playing the memory disk in the same way as done for the audio disk. When another piece of map data is to be read out after reading the map data of one map, therefore, it inconveniently takes time to search for the head address of the desired map data after reception of the read command.

A so-called magazine-disk player is known which selectively plays one of multiple (six, for example) CDs stored in a retractable/protrudable manner in a case called "magazine" that is loaded detachably in the player.

There is a system already known which selectively plays one of multiple disks by remotely controlling the magazine-disk player arranged in a suitable location in a vehicle (e.g., in the trunk).

Accordingly, when the magazine-disk player is installed in a vehicle with audio CDs and memory disks loaded in the magazine, reproduction of musical tones and map display can selectively be performed.

In such an audio disk/memory disk player, if no muting is executed at the time of playing a memory disk, the map data on the memory disk will be released as noise from a loudspeaker. Even if the muting process is carried out, when a user erroneously acknowledges the memory disk as an audio disk and gives an operation command for audio disks such as random play, the moving of the pickup will be executed in the same manner as done for audio disks with no sounds generated from the loudspeaker. The user may therefore feel strange.

A disk player, which can play both an audio disk for sound reproduction and a CD-ROM (memory disk) having map data or the like for the navigation system recorded thereon, includes a D/A converter to convert a decoded digital signal into an analog signal when the audio disk is played. When the memory disk is played by such a disk player, the digital signal is supplied to a loudspeaker through a signal processor including the D/A converter, thus producing unpleasant noise. To prevent this shortcoming, a mute circuit may be provided to inhibit the supply of the signal from the D/A converter to the next stage.

If this measure is taken to prevent noise generation, the supply of the digital signal to the D/A converter will not be stopped, causing wasteful power dissipation due to the continuing conversion operation of the D/A converter.

SUMMARY OF THE INVENTION

Considering the above, it is therefore a primary object of the present invention to provide an audio disk/memory disk player capable of rapidly searching for the specified address in a case of the memory disk being played.

Another object of the present invention is to provide an on-vehicle multisource reproducing device which can properly control the supply of a reproduction signal to a loudspeaker in accordance with the type of a disk to be played.

It is a further object of the present invention to provide an improved audio disk/memory disk player which overcomes the above-described problems of the conventional magazine-disk player.

It is a still further object of the present invention to provide a disk player which saves electric power to be wastefully consumed in a D/A converter when the memory disk is played.

An audio disk/memory disk player according to the present invention comprises: means for performing such control as to start playing a disk in response to a command; discriminating means for determining if a disk to be played is an audio disk or a memory disk; and means for performing such control as to play a music starting with a predetermined piece of music when the discriminating means judges that the disk to be played is the audio disk, and to set a pause mode when the disk to be played is judged as the memory disk.

This audio disk/memory disk player of the present invention determines whether the disk to be played is an audio disk or a memory disk at the time the disk is played, and enters the pause mode in case of the memory disk.

According to another aspect of the present invention, an on-vehicle multisource reproducing device, which has multiple audio sources including a disk player as one audio source and a selecting means for selecting one of reproduction signals from the audio sources and supplying the selected reproduction signal to a loudspeaker, comprises: means for detecting that loading a disk to a play position is complete and for generating a loading complete signal; control means for starting playing the disk in response to the loading complete signal; discriminating means for determining if the disk being played is an audio disk or a memory disk; and means for sending a selection command to the selecting means to select the reproduction signal from the disk player only when the disk is judged by the discriminating means as the memory disk.

According to the on-vehicle multisource reproducing device of the present invention, after a disk is loaded to the play position in the disk player, the device will start playing the disk first, to determine whether the disk being played is an audio disk or a memory disk. Only when the disk is judged as the audio disk, the reproduction signal from the disk player is then selected, and is supplied instead of another source to the loudspeaker.

According to a yet another aspect of the present invention, an audio disk/memory disk player comprises: means for setting a special play mode; discriminating means for determining if a disk being played is an audio disk or a memory disk; detecting means for detecting that playing for a memory area of a series of group information is complete; and control means for performing such control that, with the special play mode set, the mode is changed to a pause mode at a time of playing the memory disk when the detecting means generates a detection output, and the special play mode is enabled only at a time of playing the audio disk.

In the audio/memory disk player of the present invention, when playing for the memory area of a series of group information is complete in special play mode set, the mode is changed to the pause mode when the played disk is a memory disk, while the special play mode is enabled only when the played disk is an audio disk.

The "series of group information" is audio information of one piece of music in case of the audio disk, and is a group of map data corresponding to a sheet of map in case of the memory disk.

According to a further aspect of the present invention, there is provided an audio disk/memory disk player which comprises: discriminating means for determining whether a disk is an audio disk or a memory disk; muting means for inhibiting generation of a sound from a loudspeaker based on a discrimination result from the discriminating means; and means for ignoring at least one of operation commands based on the discrimination result.

This audio disk/memory disk player of the present invention determines if the disk being played is an audio disk or a memory disk and, if it is a memory disk that is being played, executes a muting process to shut off a sound from the loudspeaker as well as to ignore at least one of operation commands.

According to a still further aspect of the present invention, there is provided a disk player having signal reading means for reading an information signal by rotating a loaded digital disk, decoding means for decoding the information signal, and signal processing means for reproducing a digital signal from the decoding means as an audio signal, which player comprises: detecting means for detecting that the loaded disk is a memory disk; and stop means for stopping supply of the digital signal from the decoding means to the signal processing means when the detecting means detects that the disk is a memory disk.

According to the above digital disk player of the present invention, when a loaded disk is played and detected as a memory disk, this digital disk player stops the supply of the digital signal from the decoding means to the signal processing means which reproduces the digital signal as an audio signal.

DETAILED DESCRIPTION OF THE PREFERRED EMBODIMENTS

Preferred embodiments of the present invention will now be described in details referring to the accompanying drawings.

Figure 1:
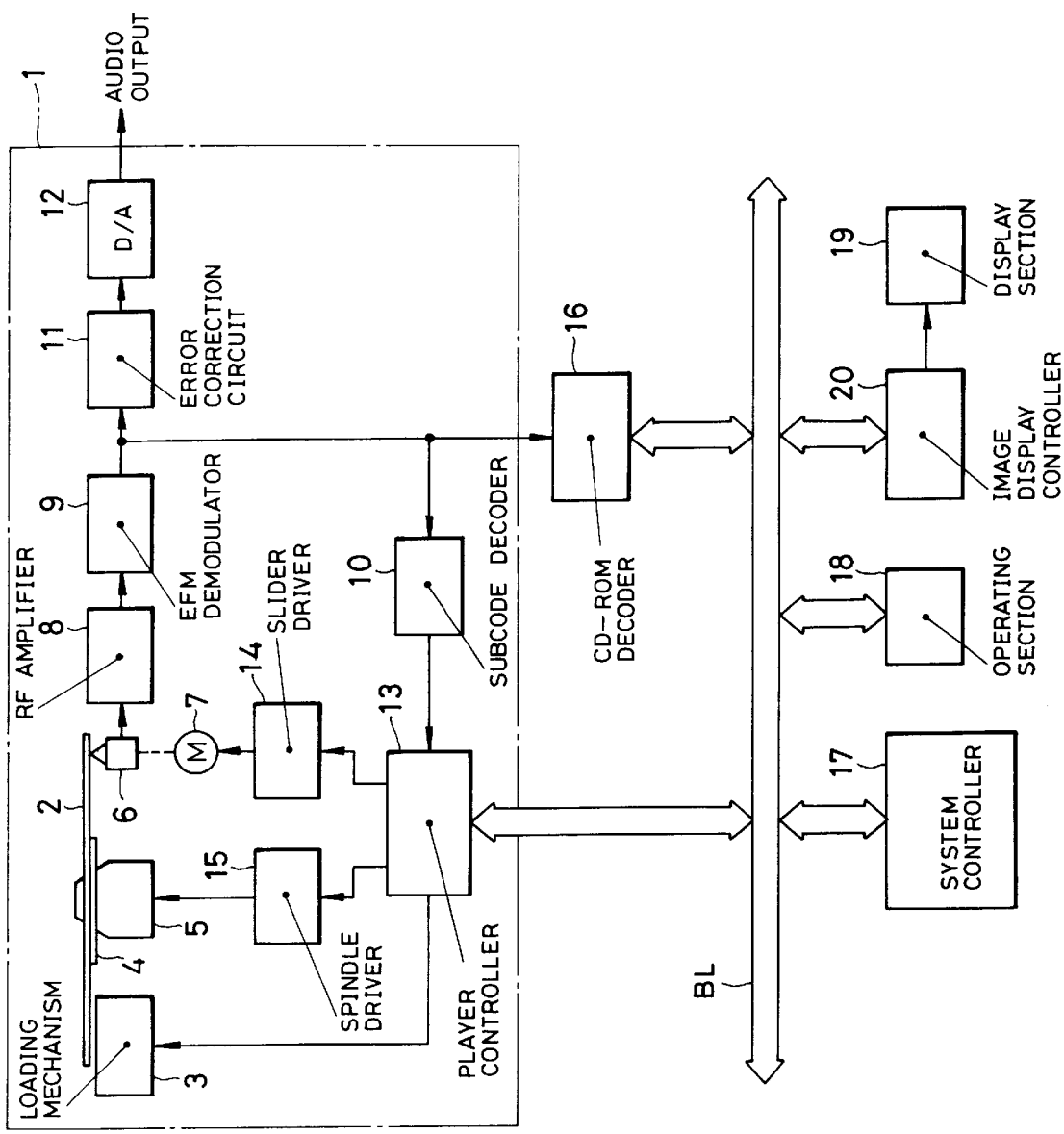
FIG. 1 is a block diagram illustrating one embodiment of an audio disk/memory disk player according to the present invention.

In FIG. 1, a disk player 1 for both an audio disk and a memory disk is a so-called slot-in type player in which, for example, a disk (hereafter used as a general term for audio and memory disks) 2 is inserted in a slot (not shown) provided at the front of a housing. In this disk player 1, the disk 2 inserted into the slot is loaded and placed onto a turntable 4, i.e., a play position, by a loading mechanism 3, and then is rotated by a spindle motor 5. An optical pickup 6 reads out information recorded on the disk 2. The pickup 6 is mounted on a slider (not shown) which is driven by a slider motor 7 in the radial direction of the disk 2.

In case of a CD format signal, the output signal of the pickup 6 is an EFX (Eight to Fourteen Modulation) signal. The read EFM signal passes through an RF amplifier 8 and is EFM-demodulated by an EFM demodulator 9. The signal is then supplied to a subcode decoder 10 as well as subjected to error correction by an error correction circuit 11. The corrected signal is converted by a D/A converter 12 into an analog signal, which is in turn output as a reproduced audio signal. The subcode decoder 10 decodes subcode information recorded frame by frame, i.e., code information, such as the numbers of music pieces, indexes, time and frame number of each music piece, and absolute time and frame number on the disk. Decoded data are sent to a player controller 13. In the lead-in area of the disk 2 is recorded the index information TOC (Table Of Contents), which includes disk identifying information to identify whether the loaded disk is an audio disk (CD) or a memory disk (CD-ROM). The TOC information is also decoded by the subcode decoder 10.

The player controller 13 comprises a microprocessor. The processor controls the loading mechanism 3, a slider driver 14 to drive the slider motor 7 for positional control of the pickup 6 in the radial direction of the disk, aid a spindle driver 15 to drive a spindle motor 5. Further, the processor 13 also determines whether the disk being played is an audio disk or a memory disk on the basis of the disk identifying information in the TOC information, which has been read out from the lead-in area at the time of playing the disk and decoded by the subcode decoder 10.

The demodulated output of the EFM demodulator 9 is also sent to a CD-ROM decoder 16. The CD-ROM decoder 16 decodes map data, which have been read out from the memory disk (CD-ROM), and demodulated by the EFM demodulator 9, to send them onto a bus line BL made of, for example, an optical fiber.

The system controller 17, comprising a microcomputer, controls the entire system. The system controller 17 is connected via the bus line BL to the player controller 13 and the CD-ROM decoder 16 to exchange information therewith. Also connected to the bus line BL are an operating section 18 which issues various commands in response to the user's key entries, and an image display controller 20 which performs control to display an image such as a map on a display section 19 comprising a liquid crystal display, for example.

Figure 2:
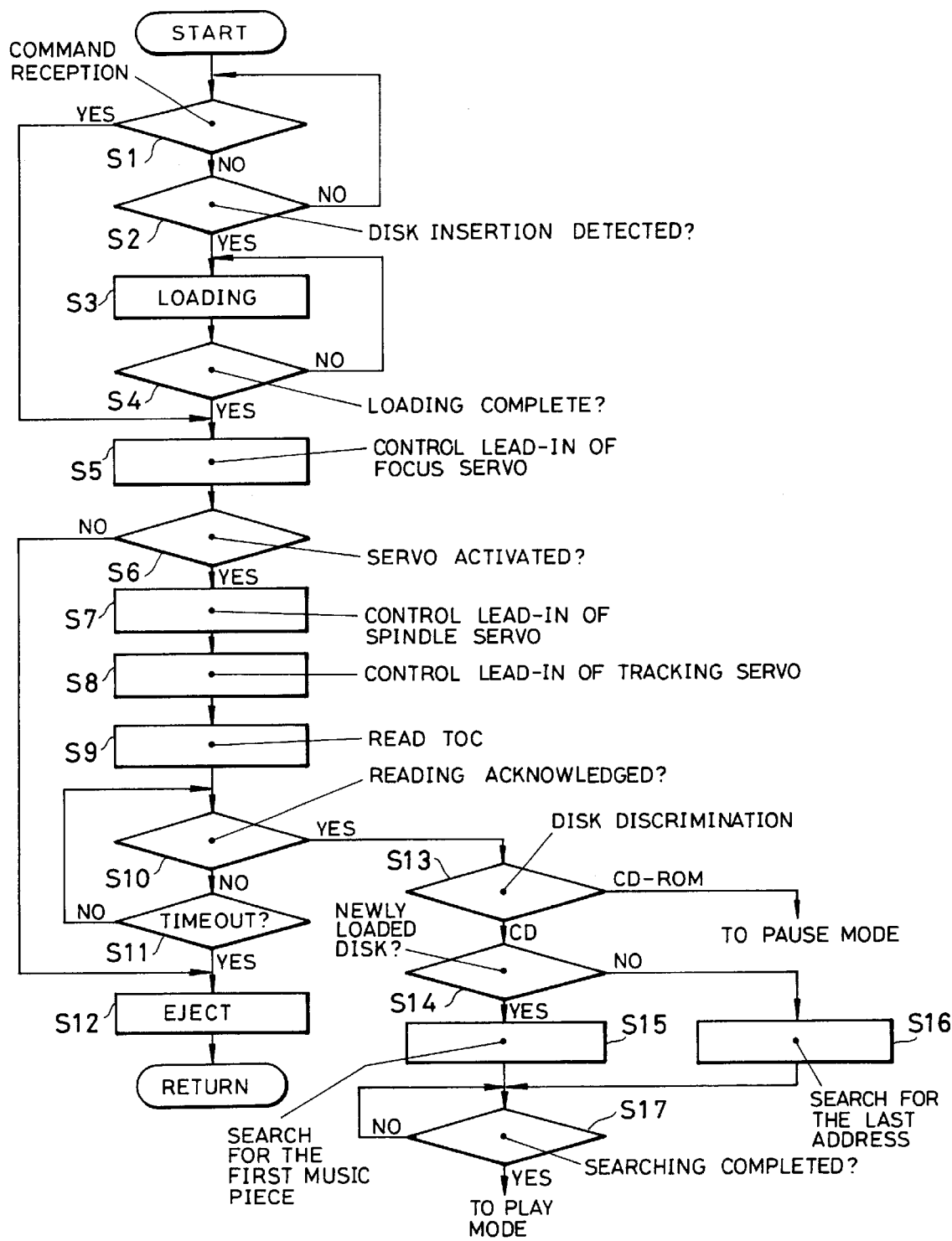
FIG. 2 is a flowchart illustrating a sequence of processes to be executed by the processor of a player controller at a time of playing a disk.

The sequence of processes that are executed by the processor of the player controller 13 at the time of playing the disk will now be described referring to the flowchart in FIG. 2. When the user inserts the disk 2 into the slot on the front of the housing to play the disk, a disk insertion detecting switch (not shown) for detecting the loading of the disk 2 is activated. This routine will be invoked and executed when this switch detects the disk insertion, or when a start command is received from the system controller 17.

The processor of the player controller 13 first determines whether the start command is received from the system controller 17 or the disk is inserted and detected by the disk insertion detecting switch (steps S1 and S2). When the disk insertion is detected, the processor controls and drives loading mechanism 3 to load the disk 2 to the play position (step S3) and then waits for a loading complete signal from a loading complete detecting switch which is not shown (step S4).

When the loading complete signal is generated, the processor performs control to invoke the focus servo (step S5). If the focus servo has been activated (Step S6), the spindle motor 5 is accelerated so as to control the lead-in of the spindle servo (Step S7), and also control the lead-in of the tracking servo (Step S8). The lead-in control of each servo system is done according to well known procedures. When the processor determines that the command has been received in step S1, the flow advances directly to step S5 where lead-in of each servo is controlled.

After completing the control of the activation of all the servo systems, the processor starts reading the TOC information recorded in the lead-in area (Step S9), and determines whether or not the reading is acknowledged (Step S10). If such a acknowledgment is not made even after a predetermined period of time is over (Step S11), the processor, considering that the disk is faulty, for example, controls and drives the loading mechanism 3 to eject the disk (Step S12). When it is determined in step S6 that the focus servo is not activated, the flow goes directly to step S12 to eject the disk. As described above, the disk is to be ejected when the focus servo is not successfully activated or the TOC information is not completely read. However, instead of ejecting the disk, the player may be disabled.

When it is determined in step S10 that the TOC information has been read, the processor judges that the played disk is the audio disk or the memory disk, on the basis of the disk identifying information in the TOC information (Step S13). When the disk is judged as the audio disk (C), the processor determines if the disk to be played is a newly loaded one or not (step S14). If the disk is the newly loaded one, the processor controls the slider driver 14 based on the address information obtained from the subcode decoder 10 to search for the head address of the first music piece (step S15). If the disk is the one that has already been read, the last address where the previous play has ended is searched for (step S16). After the search operation is complete (step S17), the processor will move on to a play mode. While the disk is played, the address information acquired by the subcode decoder 10 is stored in an internal memory, to be sequentially renewed according to the progress of the playing so that the address information finally stored will be the last address.

When it is determined in step S13 that the disk is the memory disk (CD-ROM), the processor enters a pause mode and waits for a read command from the system controller 23. In this pause mode, when the system controller 23 sends the read command of map data of the desired map, the processor of the player controller 13 searches for designated address to read out the map data corresponding to the designated map from the memory disk and supplies the image display controller 20 with the map data which have been read from the memory disk and decoded by the CD-ROM decoder 16, to display the designated map on the display 19.

As described above, according to the first embodiment of the audio disk/memory disk player of the present invention, it is first determined whether the disk to be played is an audio disk or a memory disk at the time of playing the disk. When the disk is the memory disk, the processor moves to the pause mode, and waits for the read command from the system controller. This can permit the operation to move to the process of searching for the designated address after the read command is received, so as to rapidly obtain the necessary data from the memory disk.

A preferred embodiment of an on-vehicle multisource reproducing device according to the present invention will be described in detail below. Parts in the drawing corresponding to those shown in FIG. 1 are given the same reference numerals, thus omitting their detailed descriptions.

Figure 3:
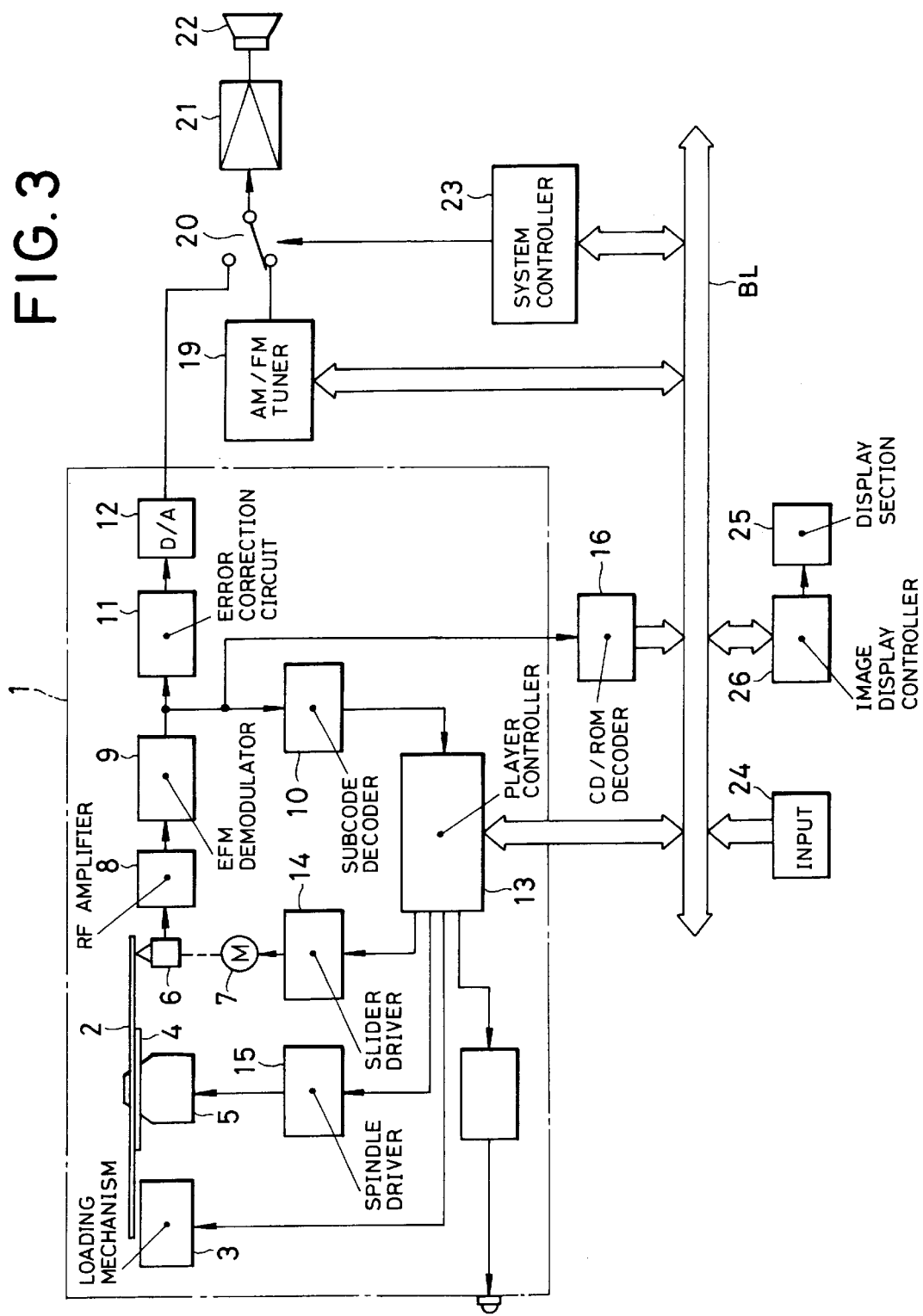
FIG. 3 is a block diagram illustrating an embodiment, as an on-vehicle multisource reproducing device, of the disk player according to the present invention.

In FIG. 3, an audio disk/memory disk player 1 is of, for example, the so-called slot-in type wherein a disk 2 is inserted into a slot (not shown) formed on the front of the housing. The term "audio disk/memory disk player" as used herein is intended to mean a disk player adapted to play both audio disks and memory disks, preferably in alternative fashion. In addition, the term "audio disk" as used herein is intended to mean a disk including information recorded thereon adapted to be audibly reproduced, such as music or other sound recordings. The term "memory disk" as used herein is intended to mean a CD-ROM having information recorded thereon other than audibly reproduceable data, such as map data. This player is provided as one of multiple audio sources in the on-vehicle multisource reproducing device.

The processor of a player controller 13 controls various drivings, such as one through an indicator driver 27 of a disk set indicator 28 provided on the front of the housing. Further, the controller 13 also determines whether the disk to be played is an audio disk or a memory disk based on the disk identifying information in the TOC information, which has been read out from the lead-in area while the disk is played and decoded by a subcode decoder 10.

The demodulated output of an EFM demodulator 9 is also sent to a CD-ROM decoder 16 as is done in the device shown in FIG. 1. The CD-ROM decoder 16 decodes map data, which have been read out from the memory disk (CD-ROM) and demodulated by the EFM demodulator 9, to send them onto a bus line BL.

Besides the aforementioned disk player 1, there is provided an AM/FM tuner 19, for example, as one of the multiple audio sources. One of the reproduction audio signals from the disk player 1 and the AM/FM tuner 19 is selected by a selection switch 20, and is sent through a drive amplifier 21 to a loudspeaker 22. A system controller 23 controls the selecting operation of the selection switch 20.

The system controller 23, comprising a microcomputer, performs the general control of the system. The system controller 23 is connected via the bus line BL (e.g., an optical fiber) to the player controller 13, the CD-ROM decoder 16 and the AM/FM tuner 19 to exchange information therewith. Also connected to the bus line BL are an input section 24 which issues various commands in response to the user's key entries, and an image display controller 26 which performs control to display an image such as a map on a display section 25 (e.g., a liquid crystal display).

Figure 4:
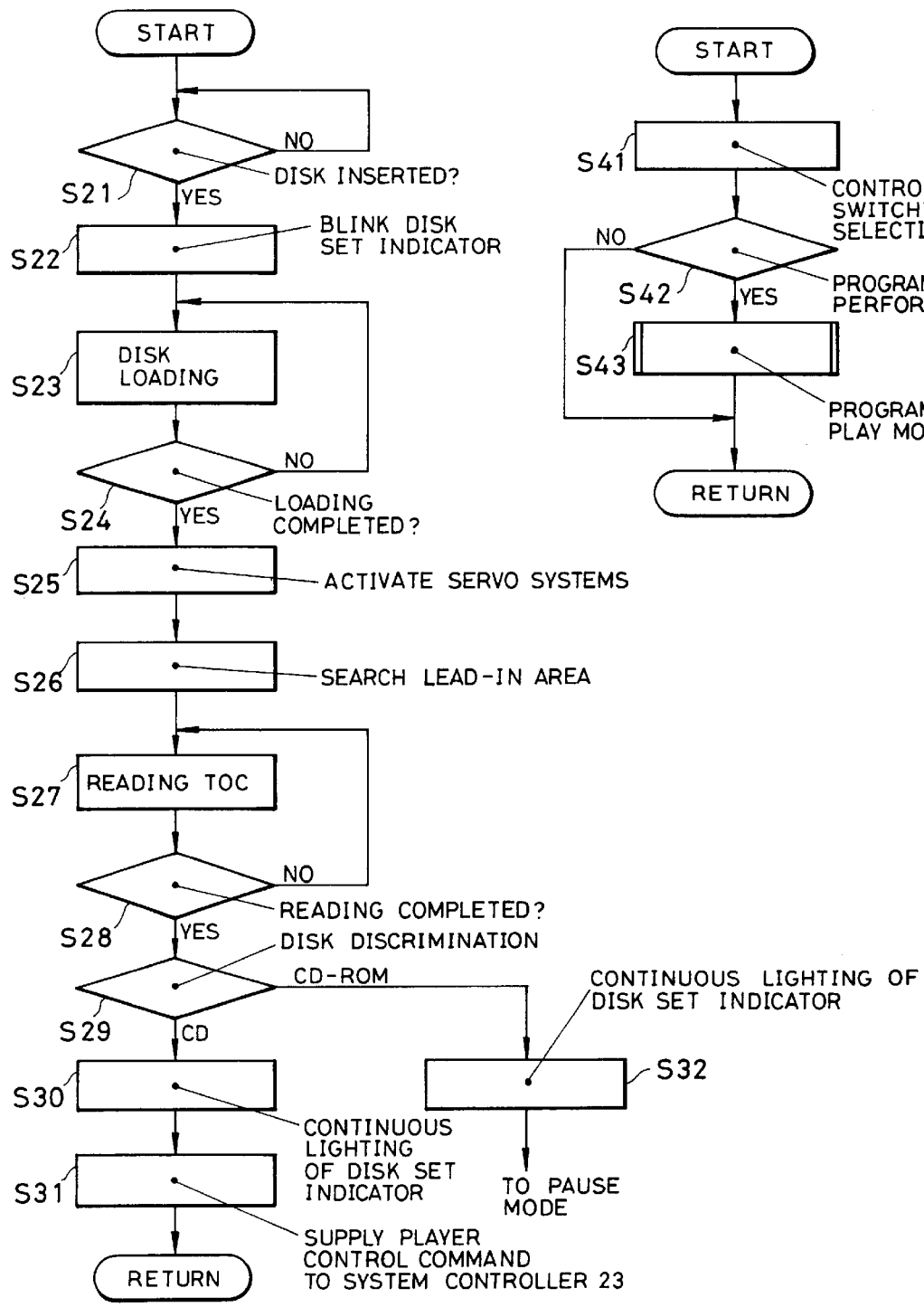
FIG. 4 is a flowchart showing a sequence of processes to be executed by the processor of a player controller at a time of playing a disk.

The process sequence that is executed by the processor of the player controller 13 at the time of playing the disk will now be described referring to the flowchart in FIG. 4. When the user inserts the disk 2 into the slot on the front of the housing to play the disk, a disk insertion detecting switch (not shown) for detecting the loading of the disk 2 is to be activated.

The processor of the player controller 13 monitors the output of the disk insertion detecting switch (step 21). When the processor detects that the disk has been inserted, it controls the indicator driver 27 to blink the disk set indicator 28 (step S22). Subsequently, the loading mechanism 3 is controlled to load the disk 2 to the play position (Step S23). Then, the processor waits for a loading complete signal from a loading complete detecting switch which is not shown (step S24).

When the loading complete signal is output, the processor performs control to activate servo systems such as spindle servo and focus servo (step S25). The processor then controls the slider driver 14 on the basis of the address information from the subcode decoder 10 to search for the lead-in area (step S26). The processor then starts reading the TOC information recorded in the area (step S27). When reading the TOC information is complete (step S28), the processor judges whether the disk being played is an audio disk or a memory disk, based on the disk identifying information in the TOC information obtained by the subcode decoder 10 (step S29). When the disk is determined to be the audio disk (CD), the processor controls the indicator driver 27 to change the disk set indicator 28 from blinking to continuous lighting (step S30). The processor then supplies a player control command to the system controller 23 (step S31). When the disk being played is determined to be the memory disk (CD-ROM), on the other hand, the processor controls the indicator driver 27 to change the disk set indicator 28 from blinking to continuous lighting (step S32). Thereafter, the processor enters the pause mode, for example, and waits for the next action.

Figure 5:
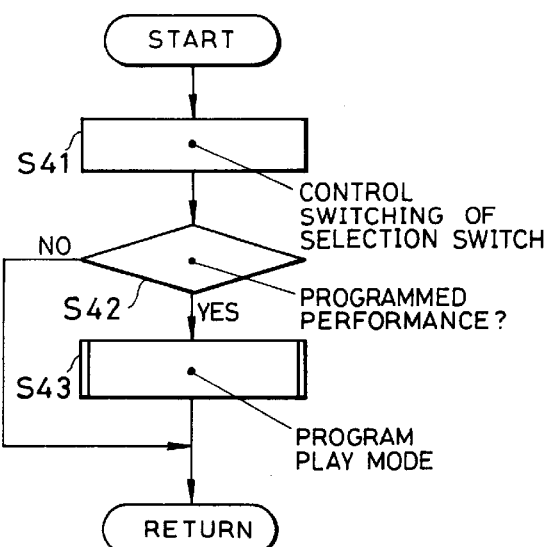
FIG. 5 is a flowchart showing a sequence of processes in player control mode executed by the processor of a system controller.

When the aforementioned player control command is issued from the system controller 13, the processor of the system controller 23, responding thereto, first executes the process of the player control mode. The process of the player control mode will now be described referring to the flowchart in FIG. 5.

Upon generation of the player control command, the processor of the system controller 23 switches the selection switch 20 to select the reproduction audio signal from the disk player 1 and to send the signal to the loudspeaker 22 (step S41). The processor then judges whether or not a programmed performance, for example, is designated as the play mode (step S42). If the programmed performance is designated, the flow moves to the program play mode through well known procedures (step S43); if not, the flow moves from the lead-in area to the program area for playing the first piece of music.

After the flow moves to pause mode in a case of a memory disk, the processor of the system controller 23 will control the disk player 1 to read the map data, which correspond to the designated map, from the memory disk. Further, the processor supplies the map data, read from the memory disk and decoded by the CD-ROM decoder 16, to the image display controller 26 to display the designated map on the display 25.

As described above, when the disk is completely loaded to the play position in the disk player 1, the player starts playing the disk and determines whether the disk is an audio disk or a memory disk. Only in case of the audio disk, the reproduction signal of the disk player 1 is selected and sent to the loudspeaker 22. Even if the memory disk is loaded into the disk player 1 to display the map while the user is listening to another source other than a CD, for example, the AM/FM tuner 19 in this (embodiment), the source will not be switched to the CD, so that the user can therefore look through the map while continuously listening to the previous source.

The disk set indicator 28 is driven blinking from the beginning of loading the disk 2 to the end of the disk judgment to indicate that the loading is in progress. It thereby appears as if the loading operation were still continuing even during the period from the end of the loading to the end of the disk judgment, so much so that it appears as if the disk player 1 were functioning during this period, so that the user will not have to feel strange.

As described above, in the embodiment of the on-vehicle multisource reproducing device according to the present invention, after loading the disk to the play position is complete, the disk will be played, and it will first be determined if the disk is an audio disk or a memory disk. Only when the loaded disk is the audio disk, the reproduction signal from the disk player is selected and is supplied instead of other sources to the loudspeaker. It is thereby possible to properly control the supply of the reproduction signal to the loudspeaker in accordance with the disk type. If the memory disk is loaded into the disk player to display the map while the user is listening to other source than a CD, the user can look through the map while continuously listening to the previous source.

The third embodiment of the present invention designed as an on-vehicle multidisk player will be described below. The structure of the player in this embodiment is the same as that of the device shown in FIG. 1, and repetition of the description will be avoided.

Figure 6:
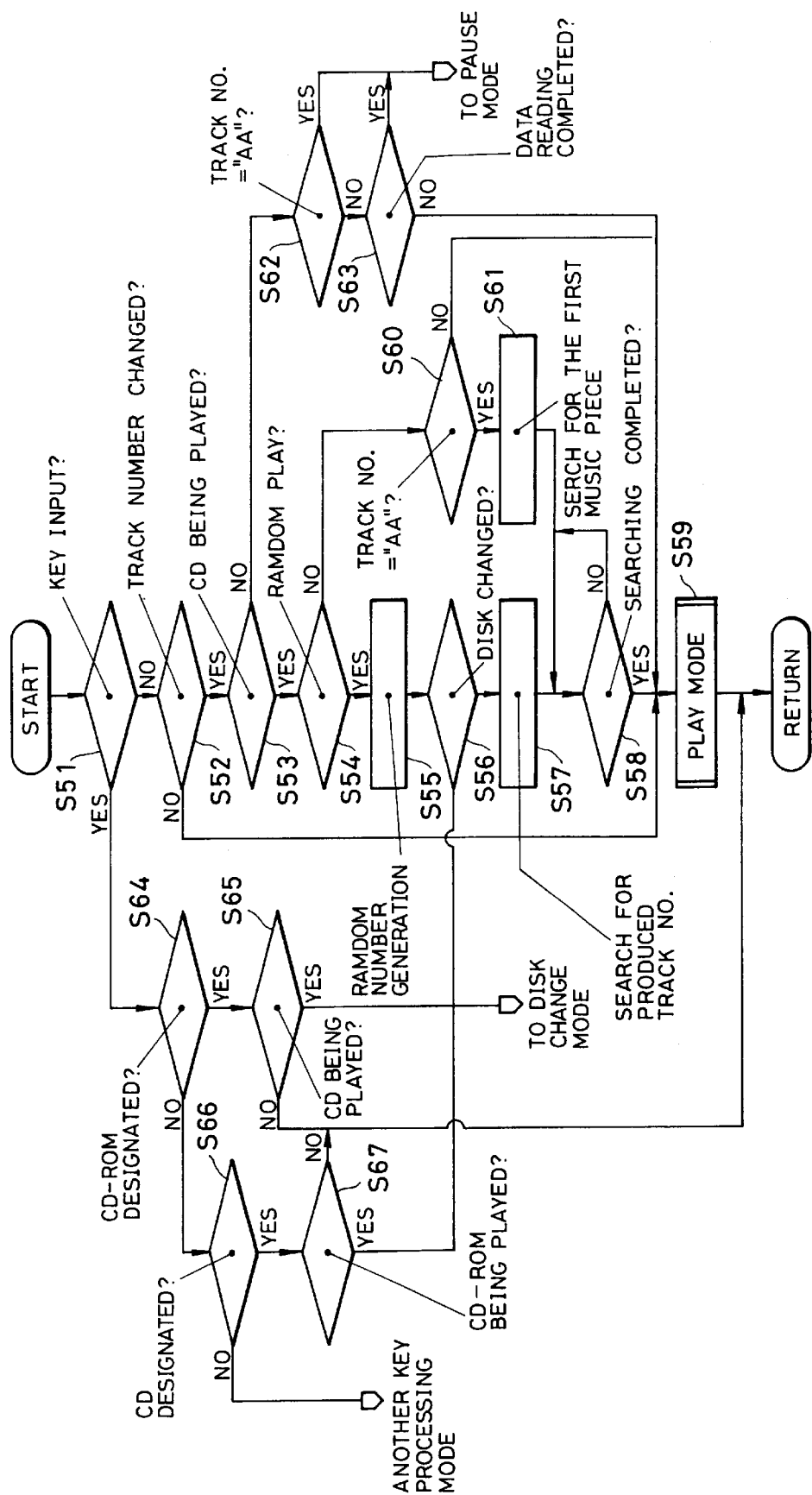
FIG. 6 is a flowchart showing another process sequence executed by the processor of the player controller of the disk player shown in FIG. 1.

A routine to be executed by the processor of the player controller 13 at the time of playing a disk will now be described referring to the flowchart in FIG. 6. It is to be noted that this routine is invoked and executed in a predetermined cycle at the disk playing time.

The processor judges whether or not a key input has been made through the operating section 18 (step S51). If no key input has been made, the processor determines based on the address information from the subcode decoder 10 whether the track number is altered, i.e., whether or not the playing for the area in which a series of group information (audio information of one piece, or a group of map data) is complete (step S52). When the track number has been changed, the processor determines if the disk being played is an audio disk (step S53). This determination is made based on the disk identifying information in the TOC information recorded in the lead-in area of the disk. This TOC information will be read in advance and stored in the internal memory immediately after the disk is loaded to the play position.

When the disk is judged as the audio disk in step S53, the processor determines if the random play mode is set (step S54). When the random play mode is set, the disk and track numbers of the next piece of music are produced at random (step S55). The processor then determines if the disk should be changed, depending on whether or not the produced disk number differs from the number of the disk being played (step S56). If the disk should be changed, the processor directly moves to the disk change mode. If not, the processor searches for the produced track number (step S57). After the search is complete (step S58), the processor will then enter the play mode (step S59) to execute the random play.

When it is not judged in step S54 that the random play mode has been set, which means the sequential play mode, the processor determines if the altered track number is "AA", i.e., if the pickup 6 has moved in the read-out area (step S60). If the pickup 6 is in the read-out area, the processor searches for the first music piece (step S61), and the operation enters the play mode upon completion of the search, thereby executing the auto repeat play. If the pickup 6 is not in the read-out area, the processor directly moves to the play mode (step S59) to cause the next music piece to be played.

When the disk being played is judged as the memory disk in step S53, the processor determines if the altered track number is "AA" (step, S62). When the track number is not "AA," the processor then determines whether or not reading all map data of the designated map is complete (step S63). If the reading is not complete, the processor moves to the play mode (step S59), reading out the remaining map data. When the track number is judged as "AA" in step S62 or the reading is incomplete in step S63, the processor moves to the pause mode and waits for the read command from the system controller 23.

In this pause mode, when the system controller 23 outputs the read command for the desired map data, the processor of the player controller 13 searches for the designated address to read the map data, which correspond to the designated map, from the memory disk. Further, the processor supplies the map data, which have been read out from the memory disk and decoded by the CD-ROM decoder 18, to the image display controller 26 to control the display of the designated map on the display 25. When it is determined in step S51 that a key input has been made, the processor determines whether or not the key input designates a memory disk (CD-ROM) (step S64). When the memory disk is specified, the processor determines if the disk being played is an audio disk (CD) (step S65). If the played disk is the audio disk, the processor moves to the disk change mode to change to the memory disk. When the memory disk is not specified in step S64, the processor determines whether or not the audio disk is designated (step S66). If the audio disk is not designated either, it means that the key input is not for disk designation. As a result, the processor moves to another key processing mode. When the audio disk is designated, the processor determines if the disk being played is the memory disk (step S67). If the memory disk is being played, the processor moves to the disk change mode to change to the audio disk.

The above embodiment has been explained with reference to the present invention applied to the multidisk player; however, this embodiment may also be applied to a single disk player.

According to the third embodiment of the audio disk/ memory disk player of the present invention, as described above, when the playing for the area having a series of information group recorded therein in the special play mode, such as auto repeat play mode or random play mode, is complete, the mode changes to the pause mode to wait for the read command from the system controller in case of the memory disk being played. This can permit prompt transition to the searching for the designated address upon reception of the read command after the playing for the recorded area is complete, so that the desired data can be rapidly read out from the memory disk.

The fourth embodiment of the present invention will be depicted below referring to the accompanying drawings.

Figure 7:
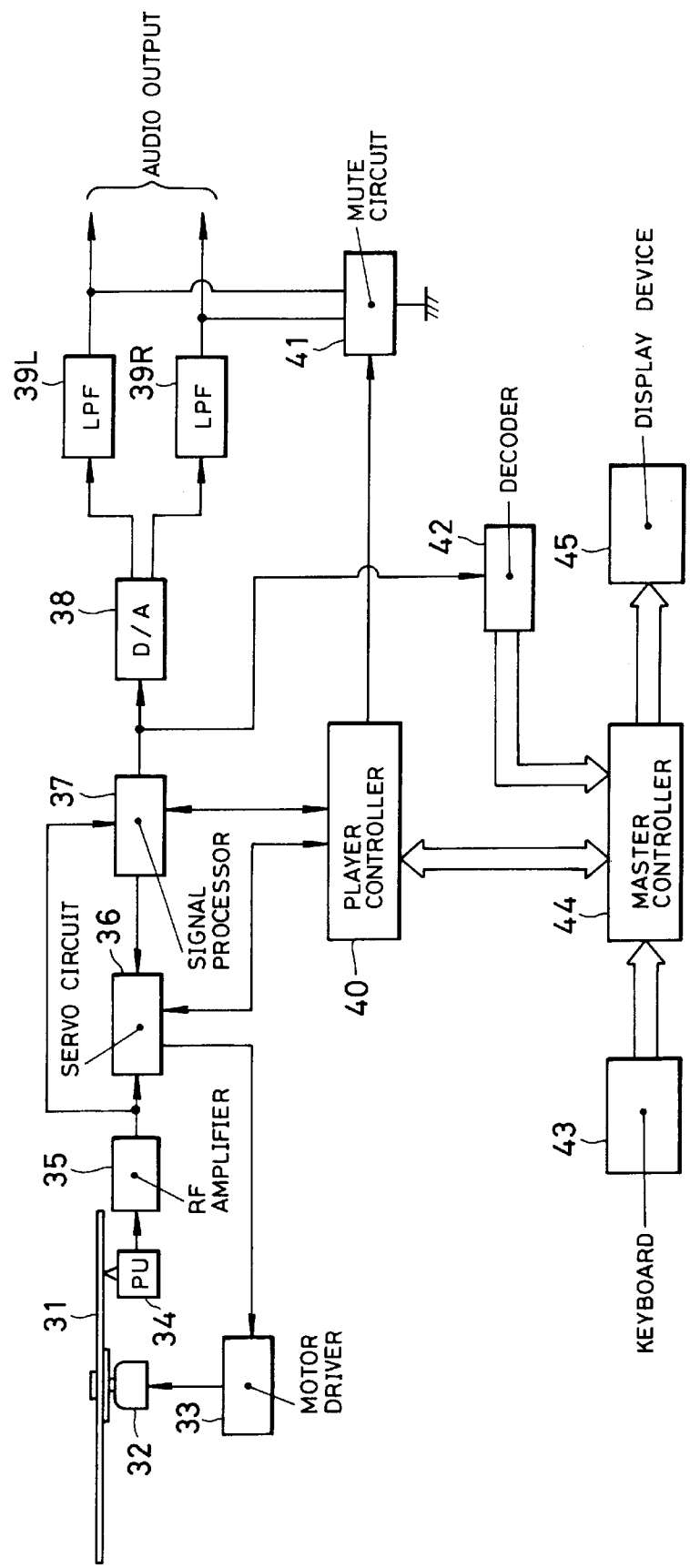
FIG. 7 is a block diagram illustrating another embodiment for describing the operation of the present invention.

In FIG. 7, a spindle motor 32, which turns a disk 31, is driven by a motor driver 33. Information recorded on the disk 31 is read by a pickup 34 and sent to an RF amplifier 35. The output of the RF amplifier 35 is then sent to a signal processor 37. The output of the signal processor 37 is supplied to a D/A (Digital/Analog) converter 38 and a decoder 42. The signal sent to the D/A converter is converted to an analog signal, and is separated to L and R components. The L and R components are sent through LPFs (Low Pass Filters) 39L and 39R to be audio outputs. A player controller 40 performs the aforementioned series of operations, and controls the ON/OFF operation of a mute circuit 41. The player controller 40 is connected to a master controller 44 via an internal bus, for example, an optical fiber, and exchanges information with the controller 44. The master controller 44 receives an operation command from a keyboard 43 operated by a user, and a signal from a information detecting means (not shown), such as a geomagnetic sensor. Also the master controller 44 displays the output data (map data, for example) of the decoder 42 on a display device, and controls the player controller through the internal bus.

With the above structure, the operation of the player controller 40 will now be described referring to flowcharts in FIGS. 8 to 10.

Figure 8:
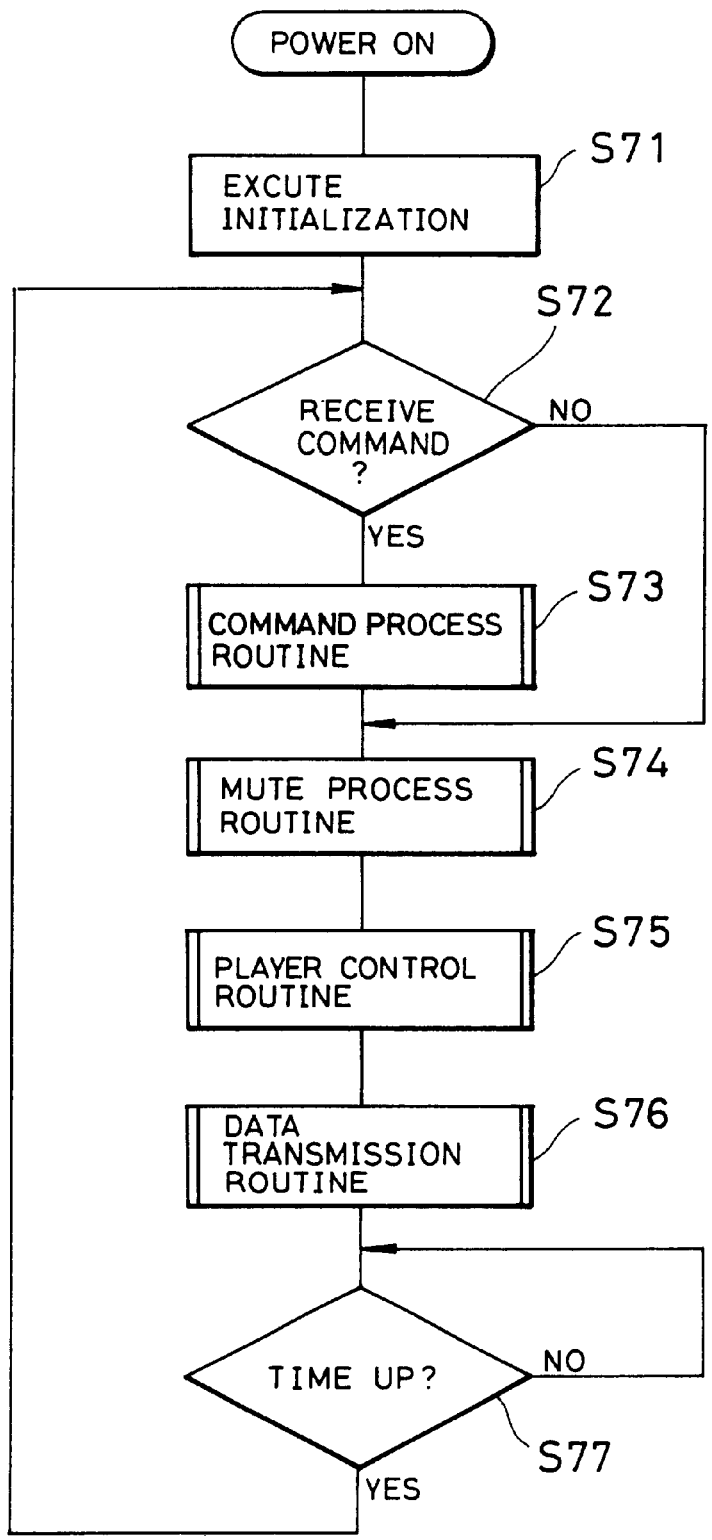
FIG. 8 is a flowchart of the main routine for describing the operation of the processor in a master controller shown in FIG. 7.

FIG. 8 represents the main routine. In this routine, when the power is turned on, the necessary initialization of the player controller 40 is executed (step S71). The player controller 40 determines in step S72 whether or not a command is received from the master controller 44. When it is judged in step S72 that the command is received, the flow moves to step S73 to execute a command process and then moves to step S74 to give the mute circuit 41 a mute command to execute a muting process. When it is not judged in step S72 that the player controller 44 has received the command, the flow advances to step S74 to execute the muting process. After the muting process is over in step S74, the flow will advance to step S75 to control the player. Then, the flow moves to step S76 to perform a data transmission. Further, it is determined in step S77 whether or not a certain period of time has passed (i.e., if the time is up). When it is judged in step S77 that the time is not up, the routine in step S77 is repeated while executing other processes (not shown) if needed. The flow goes to step S72 only when it is judged that the time is up, and each step following and including step S72 is executed again.

Figure 9:
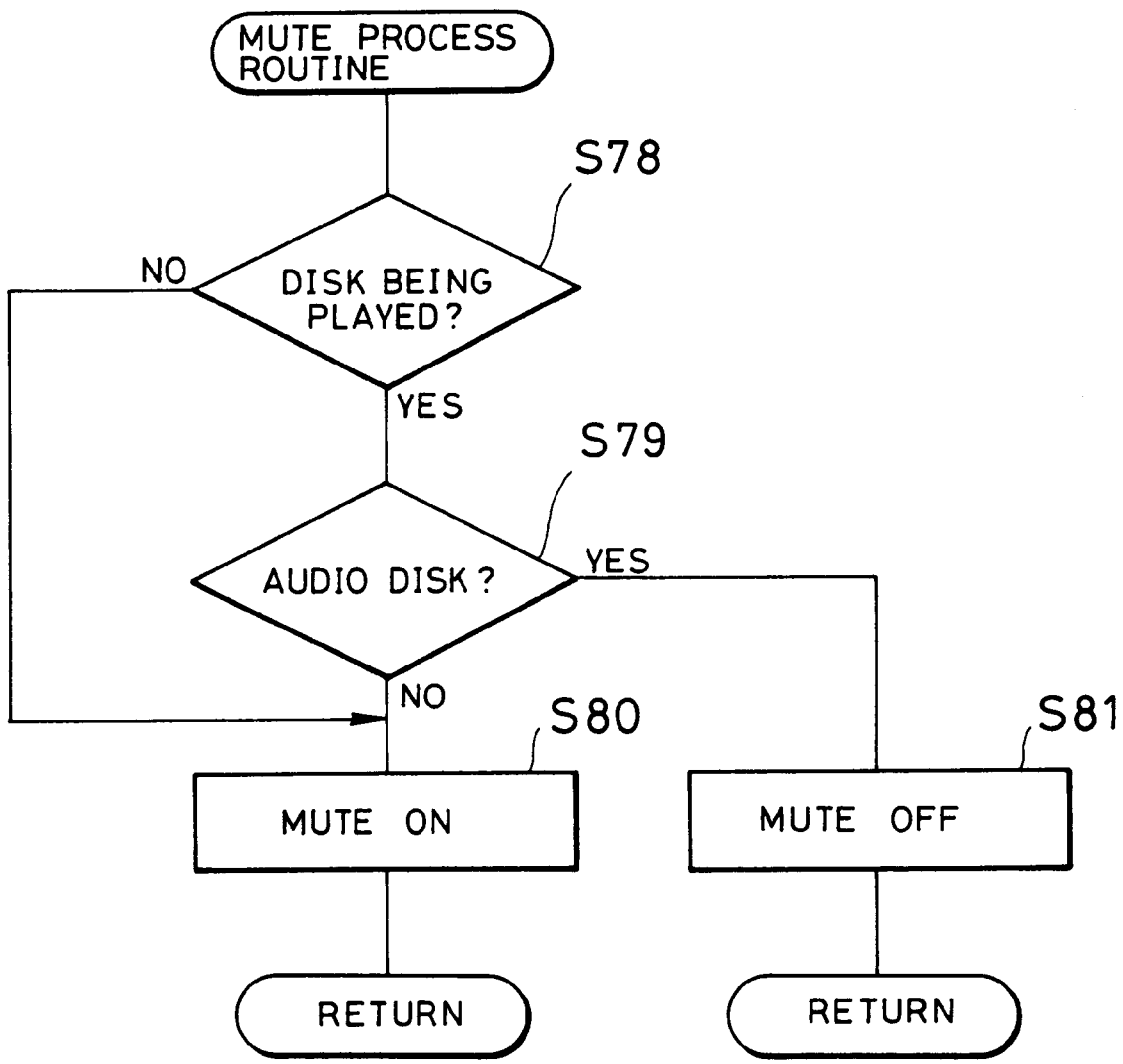
FIG. 9 is a flowchart of a subroutine for a mute process shown in FIG. 8.

FIG. 9 depicts a subroutine for the muting process. In this subroutine, when the muting process is started, the flow moves to step S78, and it is determined if the disk is being played. When it is judged in step S78 that the disk is not played, the flow advances to step S80 to set the mute on and returns to the main routine.

When it is judged in step S78 that the disk is being played, the flow advances to step S79 to determine whether the disk is the audio disk. When the disk is not judged as the audio disk in step S79, the flow moves to step S80 to set the mute on, and returns to the main routine. When the disk is judged as the audio disk, the flow goes to step S81 to set the mute off, and returns to the main routine.

The action oriented from the aforementioned process will now be explained referring to FIG. 7. In FIG. 7, the player controller 40 including the processor determines whether or not the disk 31 is being played, and if the disk 31 is the audio disk or the memory disk, thereby controlling the mute circuit. When the audio disk is being played, the controller 40 turns off the muting, and supplies the reproduction signal to the loudspeaker (not shown). When the disk 31 is not being played, or when the played disk is the memory disk, the controller 40 disables the reproduction signal to be supplied to the loudspeaker.

Figure 10:
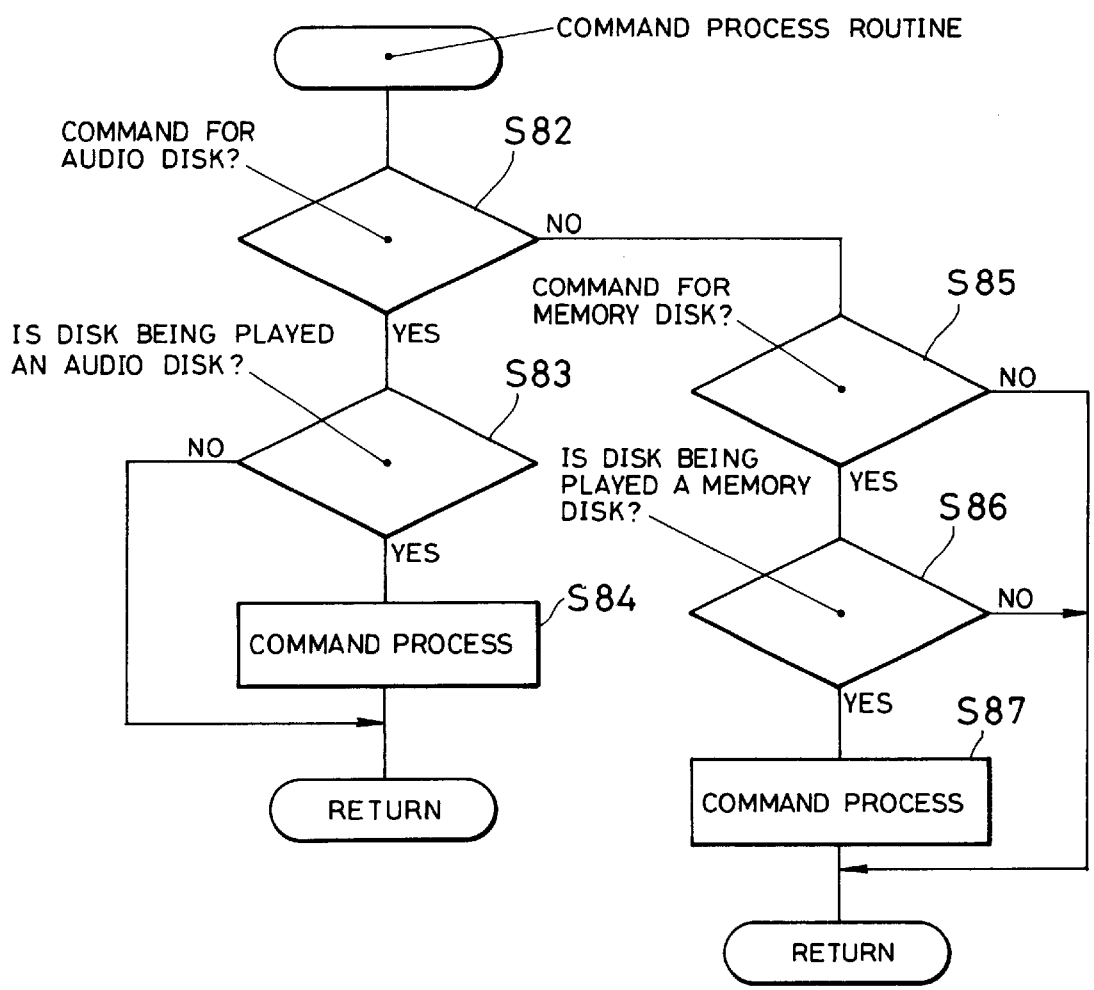
FIG. 10 is a flowchart of a subroutine for a command process shown in FIG. 8.

FIG. 10 shows a subroutine for the command process. In this subroutine, when the command process is started, the flow moves to step S82 where it is determined if the command is for the audio disk. When the command is judged as being associated with the audio disk in step S82, the flow advances to step S83 to determine if the disk being played is the audio disk. When the disk is not judged as the audio disk in step S83, the flow returns to the main routine. When the disk is judged as the audio disk, the command process is executed, and then the flow returns to the main routine.

When the command is not judged to be associated with the audio disk in step S82, the flow goes to step S85 where it is determined if the command is for the memory disk. When the command is not judged to be in association with the memory disk in step S85, the flow returns to the main routine. When the command is judged to be associated with the memory disk, the flow moves to step S86 to determine whether or not the disk being played is the memory disk. When the disk is not determined as the memory disk in step S86, the flow returns to the main routine. When the disk is judged as the memory disk, the command process is executed and the flow returns to the main routine. The commands for the audio disk include fast forward/rewind, scan and random play while the commands for the memory disk include cursor movement, map enlargement and map reduction.

The player controller 40 executes the subroutines described above, and determines whether the disk 31 being played is the audio disk or the memory disk. Of the commands issued from the keyboard 43 operated by the user, only those for the disk 31 being played are rendered valid and are executed, with the other commands not for the disk 31 played being ignored.

As described in detail above, according to the fourth embodiment of the audio disk/memory disk player of the present invention, when the disk on the turntable is not an audio disk, or when the disk is the audio disk but not being played, the muting process can be executed to inhibit noise from coming out of the loudspeaker. Further, if the user erroneously issues a command which does not correspond to the disk on play, the player regards such a command invalid and ignores it, so that the user will not have to feel strange.

The fifth embodiment of the present invention will now be described referring to the accompanying drawings. The sections corresponding to those of the device in FIG. 7 are given the same reference numerals for description.

Figure 11:
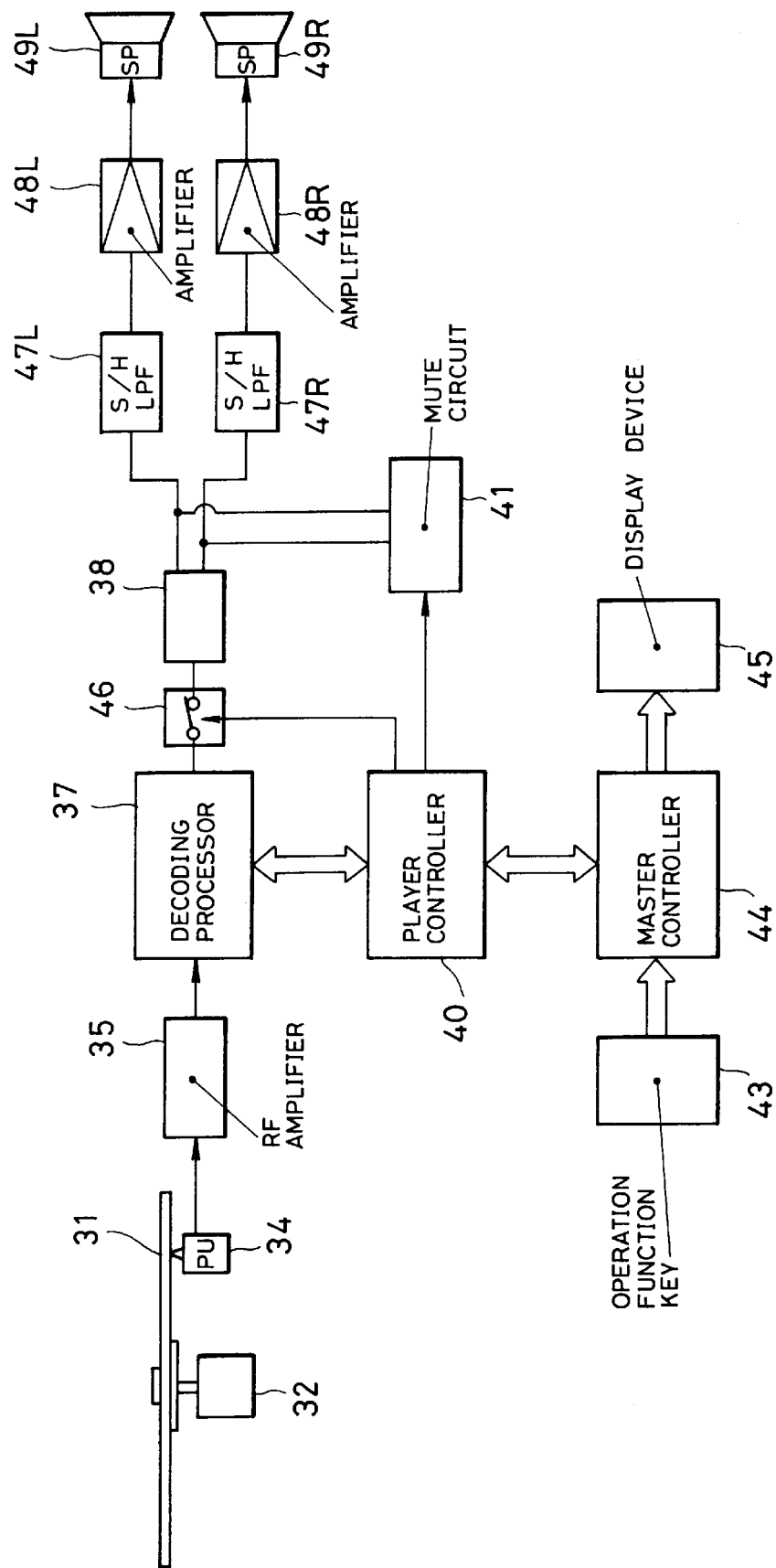
FIG. 11 is a block diagram illustrating the structure of a digital disk player according to the present invention.

In a digital disk player in FIG. 11, a loading mechanism (not shown) including retractable/protrudable trays loads the disk 31 on a disk driving mechanism 32, including a turntable, a damper and a spindle motor, so that the disk is driven. The information recorded on the disk 31 is read out by a pickup 34, and sent to an RF amplifier 35. The RF amplifier 35 amplifies the signal which has been read out and shapes the wave thereof to supply the resultant signal to a decoding processor 37. The decoding processor 37 demudulates an EFM signal to obtain a digital signal, as well as detects sync signals and subcodes and corrects erroneous data. The digital signal output from the decoding processor 37 is sent through a signal disable circuit 46 to a signal processor 38 including a D/A converter. The signal processor 38 converts the received digital signal to an analog signal, and separates it to L and R channel signals. Those L and R channel signals are respectively sent through low pass filters 47L and 47R, and are amplified by audio amplifiers 48L and 48R, to be sent to loudspeakers 49L and 49R.

In accordance with the subcode information from the decoding processor 37, a player controller 40 drives a mute circuit 41 if the disk being played is not the audio disk, and stops the transmission of the signal from the signal processor 38 to the subsequent stage, preventing noise from coming out of the loudspeakers. The player controller 40 is installed together with the aforementioned mechanisms and circuits 32 to 41 in a place in the vehicle other than the console thereof, such as in the trunk. Through a communication line such as an optical cable, the player controller 40 communicates with a master controller 44 including a CD-ROM decoder provided in the vehicular console. In response to an operation command from an operation function key 43, the master controller 44 causes a display 45 to show image information, such as map data, obtained through the player controller 40.

Figure 12:
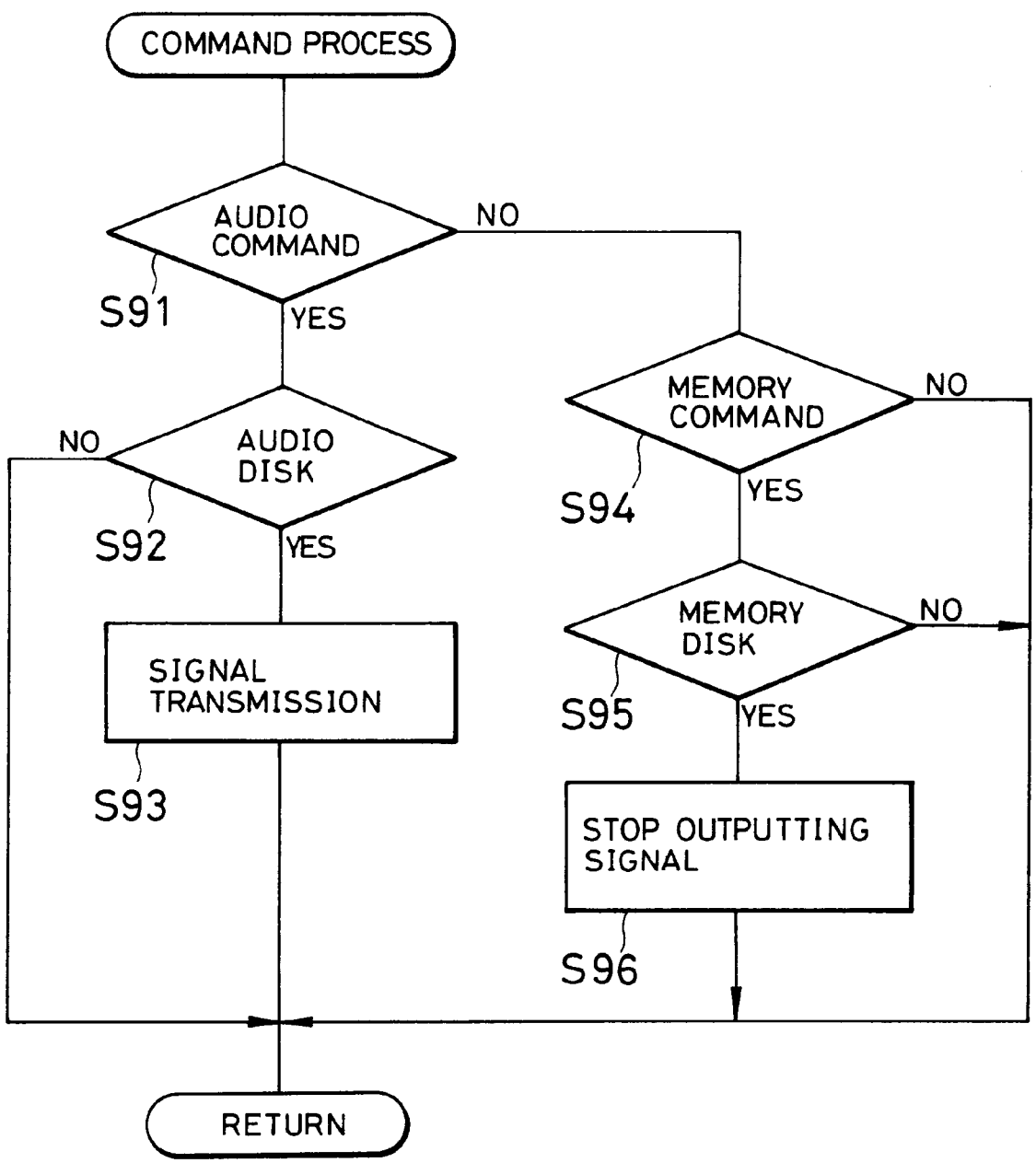
FIG. 12 is a flowchart illustrating the operation of the player controller in the disk player shown in FIG. 11.

Referring now to the flowchart in FIG. 12, a description will be given of the judgment of the disk 31 and the operational control of the signal disable circuit 46, both executed by the player controller 40. Upon receiving a command from the master controller 44 during execution of the main routine (not shown), the player controller 40 executes a command process routine. It is determined in this routine whether or not the command is an audio command (step S91).

When the command is judged as the audio command, the player controller 40 determines if the loaded disk is an audio disk (step S92). When the disk is judged as the audio disk, the controller 40 instructs the signal disable circuit 46 to relay a signal (step S93), and the flow moves to the main routine. When the command is not judged as the audio command in step S91, the controller 40 determines whether or not the command is a memory command (step S94). When the command is judged as the memory command, it is then determined if the loaded disk is a memory disk (step S95). When it is judged that the disk is the memory disk, the controller 40 instructs the signal disable circuit 46 to stop outputting the signal (step S96), and the flow moves to the main routine. When the player controller 40 judges in step S92 that disk is not the audio disk, in step S94 that the command is not the memory command, or in step S95 that the disk is not the memory disk, the flow goes to the main routine in either case.

As described above, according to the fifth embodiment of the present invention, the digital disk player automatically detects if the loaded disk is a memory disk or not. When the disk is the memory disk, the player stops sending the digital signal output from the decoding processor to the signal processor including the D/A converter. This reduces the power consumed in the signal processor, thereby decreasing the power consumption of the device.

What is claimed is:

1. A disk player capable of playing both an audio disk and a memory disk, comprising:

means for setting a special play mode;

discriminating means for determining if a disk being played is an audio disk or a memory disk;

detecting means or detecting that playing for a memory area of a series of group information is complete; and control means for changing the special play mode to a pause mode upon the detecting means generating a detection output and the discriminating means determining that the disk being played is a memory disk.

2. A disk player as claimed in claim 1, wherein the special play mode is an auto repeat play mode or a random play mode.

3. A player as claimed in claim 1, wherein the series of group information is audio information for one piece of music in case of the audio disk, and is a group of map data corresponding to a sheet of map in case of the memory disk.

* * * * *

UNITED STATES PATENT AND TRADEMARK OFFICE
CERTIFICATE OF CORRECTION

PATENT NO.    : 6,388,960 B1                                              Page 1 of 1
DATED         : May 14, 2002
INVENTOR(S)   : Furukawa et al.

It is certified that error appears in the above-identified patent and that said Letters Patent is hereby corrected as shown below:

<u>Column 14,</u>
Line 28, after "means" delete "or" and replace with -- for --
Line 37, after "A" insert -- disk --

Signed and Sealed this

Eighth Day of October, 2002

Attest:

Attesting Officer

JAMES E. ROGAN
*Director of the United States Patent and Trademark Office*